May 25, 1943.  W. G. HOLMES ET AL  2,320,037
DOUGHNUT MACHINE
Filed April 21, 1941  4 Sheets-Sheet 1

Inventors
Walter G. Holmes
William R. Coyne and
Alexander S.T. Lagaard
By Cantwell & Lagaard
Attorneys

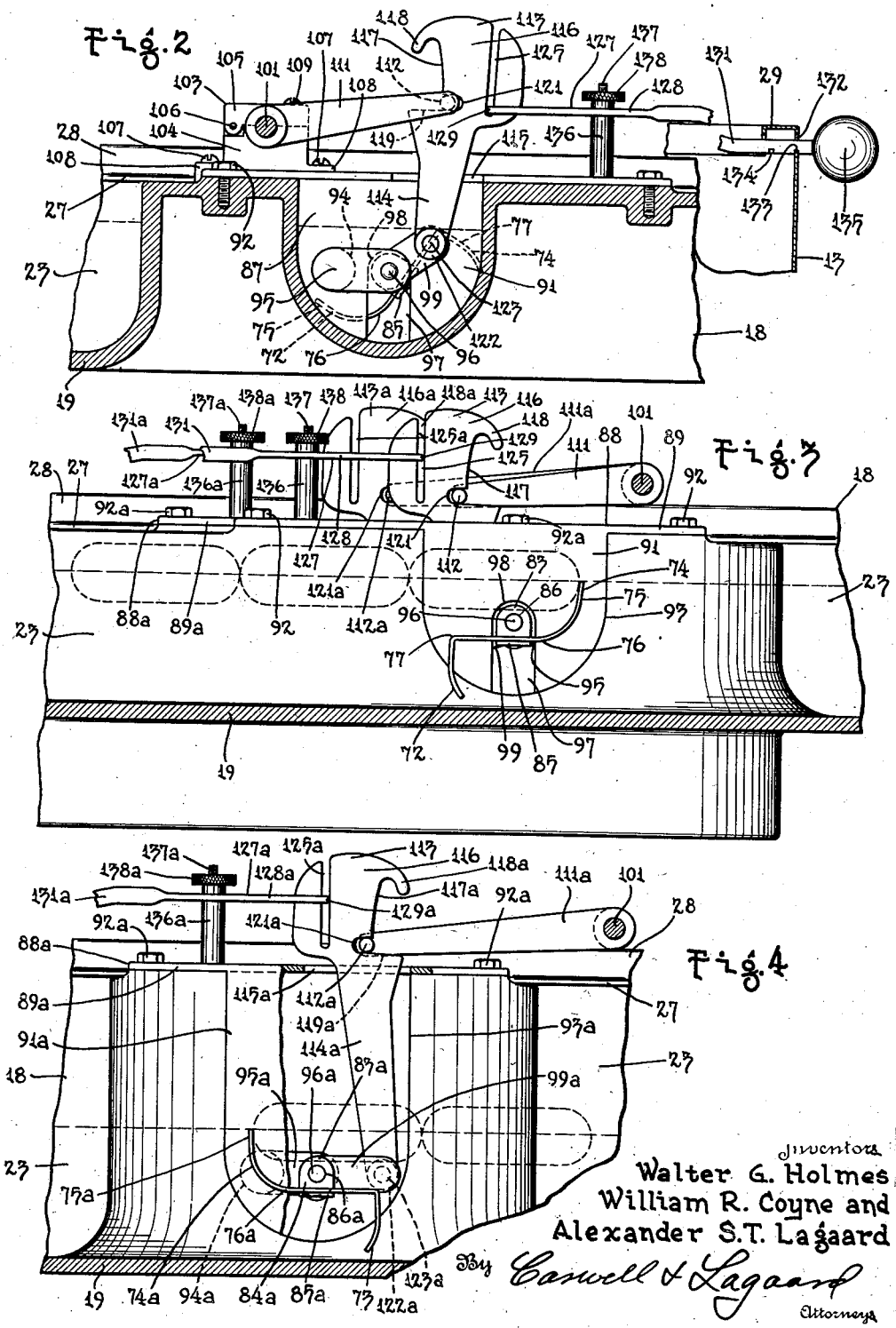

May 25, 1943.     W. G. HOLMES ET AL     2,320,037
DOUGHNUT MACHINE
Filed April 21, 1941     4 Sheets-Sheet 3
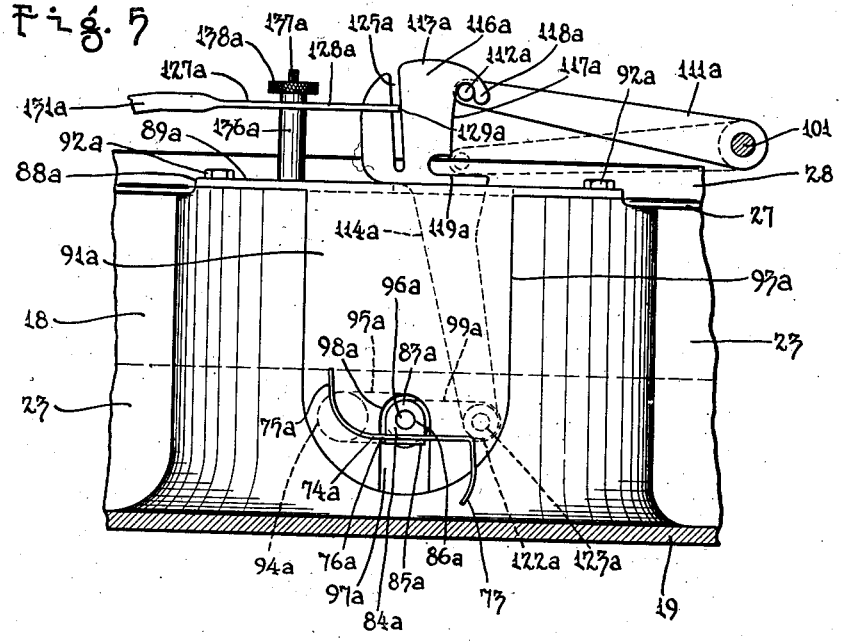
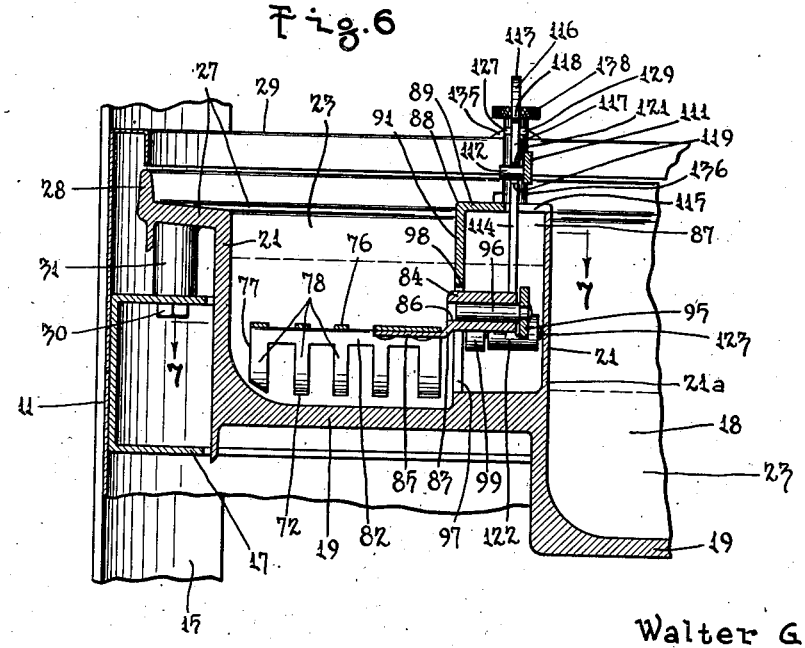
Inventors
Walter G. Holmes
William R. Coyne and
Alexander S. T. Lagaard
By Caswell & Lagaard
Attorneys May 25, 1943.  W. G. HOLMES ET AL  2,320,037
DOUGHNUT MACHINE
Filed April 21, 1941  4 Sheets-Sheet 4
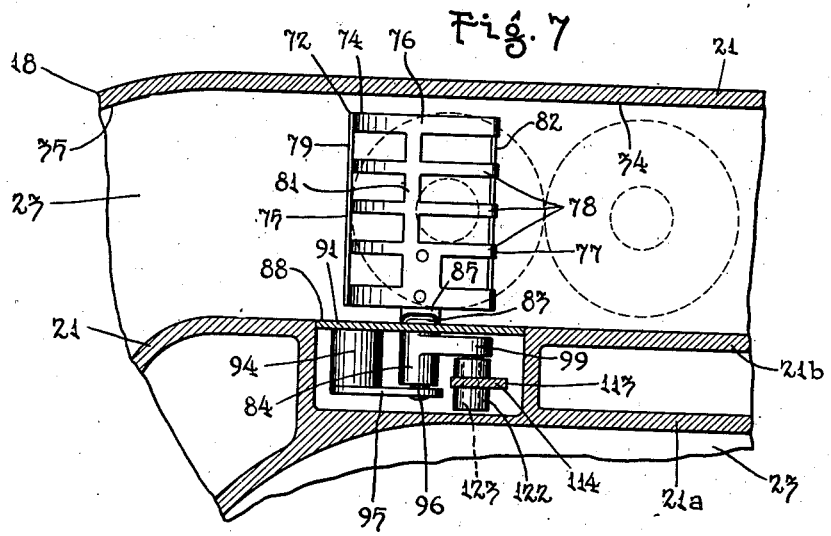
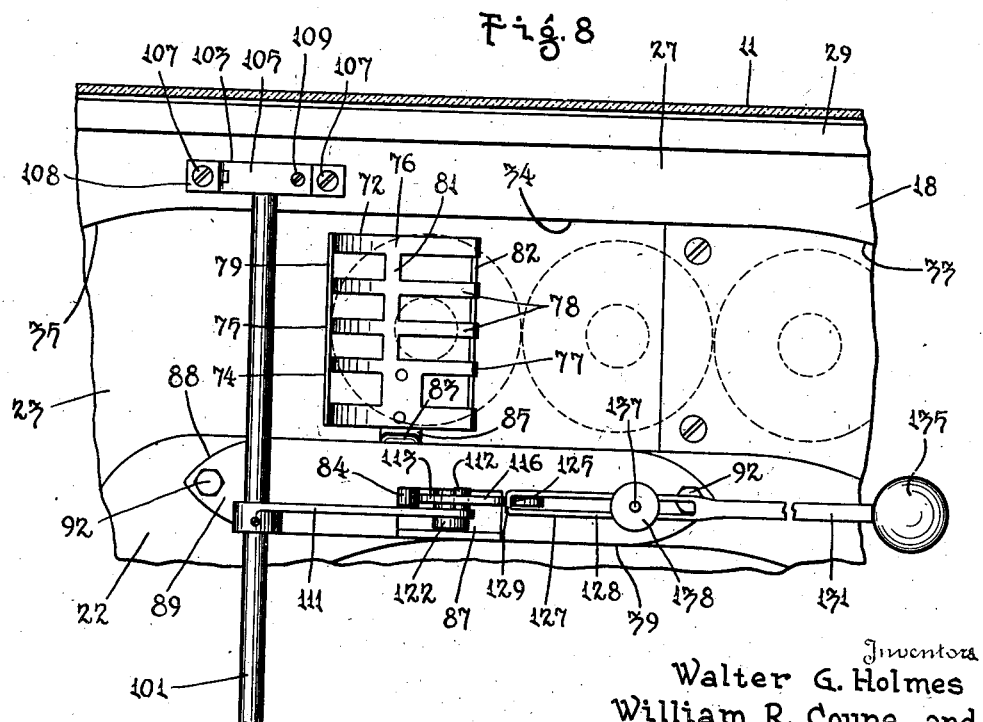
Inventors
Walter G. Holmes
William R. Coyne and
Alexander S. T. Lagaard
By Caswell & Lagaard
Attorneys Patented May 25, 1943

2,320,037

UNITED STATES PATENT OFFICE 2,320,037

DOUGHNUT MACHINE

Walter G. Holmes, William R. Coyne, and Alexander S. T. Lagaard, Minneapolis, Minn., assignors to Dough-King, Inc., Minneapolis, Minn., a corporation of Minnesota Application April 21, 1941, Serial No. 389,528

14 Claims. (Cl. 53—7)

Our invention relates to doughnut machines and particularly to doughnut machines in which the doughnuts are progressed along a channel or way in a kettle throughout a circuitous course by means of the flow of the cooking liquid.

An object of the invention resides in providing a doughnut machine of such character in which the rate of travel of doughnuts along the channel may be controlled.

Another object of the invention resides in providing a control device for use in such machine which will operate without interruption.

Another object of the invention resides in providing a construction in which the movable parts thereof are either immersed in the cooking liquid or readily accessible for cleaning.

Another object of the invention resides in providing a control device for controlling the rate of travel of the doughnuts along the channel and in providing means for rendering said control device inoperative to permit of the accumulation of a sufficient number of doughnuts upon first starting the doughtnut machine to give sufficient frying time to the doughnuts.

A still further object of the invention resides in constructing the control device with a control member movable to and fro to control the travel of doughnuts along the channel and a link movable to and fro and connected to a part movable with the control member for moving the same.

A still further object of the invention resides in providing a driving member movable to and fro and in providing connecting means between the driving member and link, together with means for rendering the connecting means inoperable.

A feature of the invention resides in constructing the driving member and link with juxtaposed parts, one of the parts having a notch and the other having a pin engaging the notch.

Another object of the invention resides in providing a shifting member for moving one of said parts for disengaging the pin from the notch.

A still further object of the invention resides in providing a device which may be easily removed from the doughnut machine.

A feature of the invention resides in providing a device in which the mechanism directly connected to the control member is contained within a pocket formed in the kettle of the doughnut machine adjacent the channel in which the control device is situated.

Other objects of the invention reside in the novel combination and arrangement of parts and in the details of construction hereinafter illustrated and/or described.

In the drawings:

Fig. 2 is an elevational sectional view taken on line 2—2 of Fig. 1 showing the parts in altered position and drawn to a greater scale.

Fig. 3 is an elevational sectional view taken on line 3—3 of Fig. 1 and drawn to the same scale as Fig. 2.

Fig. 4 is an elevational sectional view similar to Fig. 3 taken on line 4—4 of Fig. 1 with portions thereof broken away to show the construction of the device.

Fig. 5 is a view similar to Fig. 4 showing the parts in altered position.

Fig. 6 is a cross sectional view taken on line 6—6 of Fig. 1.

Fig. 7 is a plan sectional view taken on line 7—7 of Fig. 6.

Fig. 8 is a fragmentary plan view of a portion of the invention.

Figure 1:
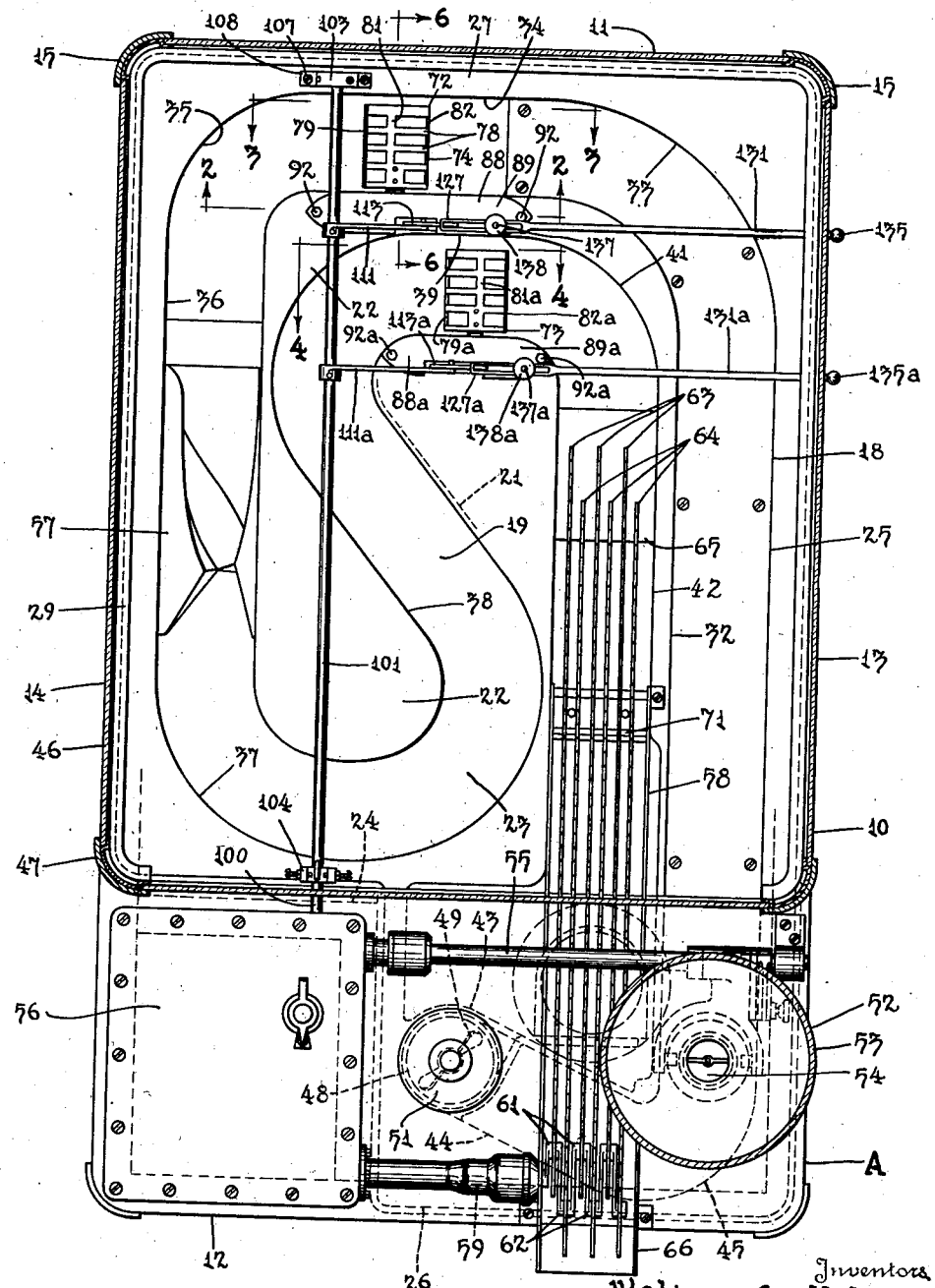
Fig. 1 is a plan sectional view of a doughnut machine illustrating an embodiment of our invention.

In the drawings we have shown a doughnut machine A which consists of a case 10 constructed with end walls 11 and 12, and side walls 13 and 14 connected therewith. The case includes uprights 15 situated at the outer corners of the same and which extend throughout the height of the case and to which the various walls are attached. Secured to the various uprights 15 are channel frame members 17 which stiffen the case and which serve as supports for the kettle of the invention.

Within the case 10 is disposed a cooking kettle 18 which is constructed with a bottom 19 and with vertical walls 21 extending upwardly therefrom. The vertical walls are connected at their upper ends with upper walls 22 and the various walls are so arranged as to form a channel 23 which extends throughout the major portion of the kettle and which provides a way along which the doughnuts may travel. The kettle 18 has one corner of the same removed, as designated at 24, leaving a main portion 25 of the width of the case 10, and of a length equal to about two-thirds of the length of the same. This construction provides an extension 26 to the kettle which extends up to the end wall 12. Kettle 18 is constructed with a ledge 27, Fig. 6 extending about the margin of the same which terminates in a lip 28 projecting upwardly from the extreme edge thereof. A guard 29 on the case 10 issues inwardly from the walls thereof and overlies the lip 29 thereby protecting the same and at the same time being spaced therefrom to retard the transmission of heat from the kettle to the case. The kettle 18 is supported on the channel frame member 17 by means of screws 30 which are threaded into bosses 31 formed on the said kettle.

The channel 23 is arranged to provide a straight run 32 which commences in close proximity to wall 12 and which follows along wall 13. The channel 23 at the end of the run 32 makes a curve 33 which leads into a transverse run 34 extending along the wall 11. This latter run connects with a sharp curved portion 35 which in turn is connected to another straight run 36. The run 36 follows closely along the wall 14. The run 36 is connected to a curved run 37 extending up to the end of the major portion 25 of the kettle at the corner 24 thereof. The run 37 is connected to an S-shaped run 38 generally extending longitudinally of the kettle and disposed adjacent the run 36 and extending in the opposite direction. The S-shaped run 38 is connected with another transverse run 39 which follows along the run 34. Run 39 is connected through a sharp curved portion 41 with another longitudinal run 42 disposed adjacent the run 32 and extending in the opposite direction therefrom. The run 42 discharges into a reservoir 43 which is merely an enlargement of said run. From this reservoir a short run 44 is provided which is connected by means of a curved run 45 with the beginning of the run 32. A portion of the reservoir 43, the run 44 and the run 45, and the beginning of the run 32 are all disposed in the extension 26 of kettle 18.

The major portion 25 of the kettle 18 is enclosed by means of a hood 46. This hood utilizes the uprights 15 at the end wall 11 and two other uprights 47 which are attachd to the case at the locality of the portion 25 thereof. The construction of the hood 46, not forming any particular feature of the invention, has not been shown in detail, though it can readily be comprehended that any suitable construction may be used for the purpose.

In the reservoir 43 is provided a vertical tubular duct 48 which communicates at its lower end with the said reservoir. In this duct is provided an impeller or elevator 49 which is mounted on the armature shaft of a motor 51. The duct 48 communicates at its upper end with the run 44 of channel 23, thus discharging the cooking liquid from the reservoir 43 and into the run 44 of the channel from which it flows throughout the course of the channel and is returned into the reservoir 43.

Situated at the beginning of the run 32 of channel 23 is a doughnut former 52. This doughnut former comprises a receptacle 53 for raw dough and a suitable cutter 54 connected therewith. Such construction being well known in the art will not be described in detail in this application. The cutter 54 is periodically operated by means of a shaft 55 which is driven by a transmission, not shown in the drawings, but contained within a case 56 situated in the corner 24 of kettle 18.

In the run 36 of channel 23 of kettle 18 is arranged a twisted tubular turner 57. This turner inverts the doughnuts after the same have been cooked a predetermined length of time so that the said dougnut may be cooked equally on both sides thereof. Such devices being well known in the art the turner 57 will not be described in detail in this application.

For removing the cooked doughnuts from the machine, an ejector 58 is employed which is disposed in the run 42 of channel 43. This ejector comprises a shaft 59 which is continuously driven from the transmission within the housing 56. This shaft has mounted on it oppositely extending cranks 61 and 62. Sets of toothed blades 63 and 64 are mounted on the ends of said cranks and are adapted to be alternately raised and lowered as the shaft rotates. The lower ends of these blades slide upon an incline rest 65 which is mounted on the bottom of kettle 18 in the portion of the run immediately following the corner 41 of the channel. It will readily be comprehended that, as the doughnuts reach the said blades, the doughnuts are elevated and progressed upwardly and outwardly of the cooking kettle 18. The ejector 58 is disposed within a trough 66 which returns any cooking liquid removed from the doughnuts back into the kettle 18 and which also discharges the doughnuts from the machine.

For controlling the elevation of the cooking liquid in the channel 23 a dam 71 is used which extends across the run 42 of channel 23 at the beginning of the reservoir 43. The cooking liquid in flowing through the channel 23 passes over this dam which serves as a weir and is maintained at a predetermined elevation thereby.

The invention proper comprises two control devices 72 and 73 which control the rate of travel of the doughnuts to the turner 57 and ejector 58. The control device 72 will now be described in detail. This control device includes a cradle 74, best shown in Figs. 3 and 7, which cradle is constructed from sheet metal and is formed to provide a forward portion 75, an intermediate portion 76 and a rearward portion 77. The two portions 77 and 75 are angularly disposed relative to one another and gradually merge into the intermediate portion 76. The two portions 75 and 77 form engaging members which engage the doughnut and which function in the same manner as the device illustrated in Patent No. 2,207,546 issued to Alexander S. T. Lagaard July 9, 1940. The entire cradle 74 is constructed with spaced parallel bars 78 which extend in the direction of travel of the cooking liquid in the channel 23 and which are connected together by means of cross bars 79, 81 and 82. These various bars are formed by stamping the sheet material from which the cradle is constructed.

The cradle 74 is supported on a casting 83 which is constructed with a boss 84 and a lug 85 projecting outwardly therefrom. The lug 85 underlies the cross bar 81 and is riveted thereto so as to support the cradle 74. The boss 84 is formed with a bore 86 which serves as a bearing by means of which the cradle is journaled for oscillation.

The mechanism for rotatably supporting the cradle 74 and for operating the same is contained within a pocket 87 formed between two of the walls 21 of kettle 18 which are disposed adjacent the two runs 34 and 39 of the said kettle and which have been specifically designated as 21a and 21b. This pocket is closed on the side of the run 39 by means of the wall 21a and opens into the run 34. The said pocket is also open at the top. For closing the pocket 87 a closure 88 is employed which has a horizontal portion 89 and a vertical portion 91. The horizontal portion 89 is adapted to rest upon the upper wall 22 of the kettle 18 between the runs 34 and 39 thereof and is secured to said wall by means of cap screws 92 which pass through said horizontal portion and are threaded into the wall 22. The vertical portion 91 of said closure is supported through the horizontal portion 89 and extends into the opening 93 of the pocket 87 and closes the same. This portion of the closure lies flush with the outer surface of the wall 21b of kettle 18.

Attached to the vertical portion 91 of closure 89 is a stud 94 which is best shown in Fig. 7. This stud has issuing from it a bracket 95, which bracket has attached to it a stub shaft 96 extending at right angles to the plane of the portion 91 of closure 88. The shaft 96 of bracket 95 and the stud 94 are all located within the pocket 87. In the vertical portion 91 of the closure 88 is a vertically extending slot 97, the upper portion 98 of which is circular in form and concentric with the axis of the stub shaft 96. This portion of the slot 97 is of sufficient dimensions to permit of insertion of the boss 84 of cradle 74 through the closure 91 and inwardly into the pocket 87.

The boss 84 has issuing from it an arm 99 which is disposed within the pocket 87 and is closely positioned to the inner surface of the portion 91 of closure 88. This arm, when the cradle is in operative position, engages the inner surface of the portion 91 of closure 88 and prevents withdrawal of the cradle from the stub shaft 96.

For operating the control devices 72 and 73 a rock shaft 101 is employed which is disposed a short distance above the kettle 18 and which is connected to a short shaft 100 by means of a coupling 104. The shaft 100 extends into the transmission case 56 and is operated by any suitable means within the same so that the shaft 100 rocks to and fro in accordance with the operation of the shaft 55. The movement of the shaft 100 is timed so that it completes a cycle of oscillation every time a doughnut is deposited by the cutter 54. The shaft 101 is journaled at its outer end in a bearing 103 which may be opened up to release the said shaft. This bearing is shown in Fig. 2 and comprises a lower portion 104 with a cap 105 hinged to the lower portion by means of a pintle 106. The lower portion 104 is secured to the ledge 27 of the kettle 18 by means of screws 107 which pass through ears 108 issuing therefrom. A screw 109 holds the two parts of the bearing together.

The shaft 101 has secured to it an arm 111 which overlies the kettle 18 and is disposed in proximity to the pocket 87. The arm 111 has attached to the outer end thereof a pin or lug 112 which is adapted to cooperate with a link 113 now to be described in detail.

The link 113 is preferably constructed of sheet metal and is formed with a shank 114 which extends through an opening 115 in the horizontal portion 89 of the closure 88. The said link is further constructed with a head 116 which is formed with an arcuate surface 117 at the locality of the pin 112. The said head is constructed with a hook 118 and with a shoulder 119. At the lower end of the surface 117 is formed a notch 121, the lower surface of which lies in continuation of the shoulder 119. This notch is of such dimensions as to receive the pin 112 and when said pin is in engagement with the notch the arm 111 serves to raise and lower the link 113. The shank 114 of link 113 has a boss 122 formed thereon at its lower end which is adapted to be slid over the protruding end of a stub shaft 123 which issues outwardly from the arm 99. This boss is closely positioned to the inner surface of the wall 21a of kettle 18 and is thus prevented from becoming disengaged from the shaft 123 when the device is assembled with the closure 88 in place.

When the pin 112 on arm 111 is in engagement with the notch 121, the link 113 is reciprocated and the arm 99 and the cradle 74, which is operated thereby oscillated. This causes the cradle to function as disclosed in the patent above referred to, to control the passage of doughnuts through the way 23 of kettle 18. When the link 113 is swung toward the right about the shaft 123 as a pivot, when viewed as in Fig. 2, the pin 112 becomes disengaged from the notch 121 and moves freely along the surface 117 between hook 118 and shoulder 119. The said pin, when engaging shoulder 119, forces the link 113 to its lowermost position and upon reversal in movement leaves the shoulder and travels free from the link 113.

For the purpose of moving the said link in a manner to disengage pin 112 from notch 121, the head 116 of link 113 is constructed with a vertically extending slot 125. For cooperation with this slot we employ a U-shaped member 127 which has two spaced arms 128 and a connecting portion 129. The arms 128 are connected to a shift rod 131 which extends outwardly through the case 10. The shift rod 131 passes through an opening 132 in the wall 13 of case 10 immediately below the guard 29 and is constructed with notches 133 and 134 which are adapted to engage the said wall and hold the said rod in position. When the rod 131 is raised the same may travel freely in the opening 132 and when lowered at the proper position the notches 133 and 134 effect a lock for the said rod. Said rod may be manipulated by means of a knob 135 secured to the outer end thereof. The shift rod 131 is supported at its inner end by means of a post 136 which has a threaded stem 137 extending upwardly therefrom. This stem passes between the arms 128 of the U-shaped member 127 and guides the same for movement. A nut 138 screwed upon this stem holds the member 127 in proper position. It will thus be readily comprehended that the link 113 may be swung in a manner to bring the pin 112 of arm 111 into or out of engagement with the notch 121.

Inasmuch as the control device 73 is almost identical with the control 72 the description of the parts thereof will not be repeated and the same reference numerals with the suffix a appended will be used to designate the corresponding parts. It will be noted that the portion 39 of channel 23 in which the control device 73 is located is deeper than that in which the control device 72 is situated. Consequently the link 113a is somewhat longer than the link 113. Also the arm 111a for operating said link being connected to the same shaft 101 becomes slightly longer than the arm 111, due to the fact that the two control devices are not situated at exactly the same relative positions with respect to the central line of the kettle. The flow in the run 34 of channel 23 being from right to left and in the run 29 being from left to right, the link 113a is disposed on the opposite side of the shaft 96a. For the exception of these differences the two devices are constructed exactly the same and operate in the same manner.

The method of using our invention is as follows: In the starting of the doughnut machine the dough receptacle 52 is first filled with dough and the cutter mechanism 54 actuated. At the same time the cooking liquid is caused to circulate throughout the channel 23 by means of the motor 51 and the elevator 49. As the dough formations are deposited in the run 32 the same progress toward the control device 72. In order to give the doughnuts sufficient frying time it becomes necessary that a number of doughnuts be accumulated in the runs 32 and 33 and 34 ahead of the turner 57. For this purpose the control rod 131 is manipulated to stop the control device 72. This is brought about by moving the rod outwardly and bringing the notch 134 into engagement with the wall 13. The control device is then moved downwardly until the engaging portion 75 thereof is in position to engage the doughnuts. The arm 111 and the pin 112 thereafter travel freely. When the proper number of doughnuts have accumulated in back of the control device 72, shift rod 131 is manipulated to bring the pin 112 into engagement with notch 121. The device then functions in the normal manner allowing one doughnut at a time to pass into the turner. The control device 73 is also stopped to permit of accumulation of doughnuts in the runs 37 and 38 leading up to the ejector 58. As soon as sufficient number of doughnuts have accumulated in back of the control device 73, the same is also placed in action and the doughnut machine functions in the normal manner.

The advantages of our invention are manifest. The control device is extremely simple and highly practical in construction. The device has a minimum number of moving parts which can be readily disassembled for cleaning and inspection. With our invention the use of auxiliary gates for controlling the accumulation of doughnuts when the machine is first set into operation is entirely eliminated. With our invention the deposit of carbon and other matter from the fumes of the cooking liquid upon the parts of the control device will not interfere with the operation of the same.

Changes in the specific form of our invention, as herein disclosed, may be made within the scope of what is claimed without departing from the spirit of our invention.

Having described our invention, what we claim as new and desire to protect by Letters Patent is:

1. In a doughnut machine in which the doughnuts are progressed along a way through the flow of the cooking liquid, a doughnut control member movable in opposite directions to control the travel of the doughnuts along the way, a link movable in opposite directions and connected to a part movable with said control member, a driving member movable in opposite directions, connecting means between said link and said driving member, and means for rendering said connecting means inoperable.

2. In a doughnut machine in which the doughnuts are progressed along a way through the flow of the cooking liquid, a doughnut control member movable in opposite directions to control the travel of the doughnuts along the way, a link movable in opposite directions, a driving member movable in opposite directions, connecting means between said link and control member, connecting means between said link and driving member, and means for rendering one of said connecting means inoperable.

3. A doughnut machine comprising a kettle having a way along which the doughnuts are progressed through the flow of the cooking liquid, said kettle having a pocket adjacent a portion of said way, a control member, a pivotal support for said control member having a horizontal axis, means movable with said control member and extending into said pocket, a link extending into said pocket and connected to said last named means, said link being movable in an up and down direction to procure oscillation of said control member about the pivot means, a swinging arm disposed above the cooking kettle, connecting means between said link and arm, and means for disconnecting said link and connecting means.

4. In a doughnut machine in which the doughnuts are progressed along a way through the flow of the cooking liquid, a doughnut control member, pivot means for pivoting said control member for oscillation to control the travel of the doughnuts along the way, a link pivotally connected to a part movable with said control member at a locality eccentric from the axis of said control member and serving to oscillate said control member, a driving member movable to and fro in the direction of extent of said link, said driving member and link having two cooperating parts engaging one another for imparting movement to said link, and means for moving said link about its pivot to disengage said cooperating parts.

5. In a doughnut machine in which the doughnuts are progressed along a way through the flow of the cooking liquid, a doughnut control member, pivot means for pivoting said control member for oscillation to control the travel of the doughnuts along the way, an arm movable with said control member, a link pivoted to said arm for movement about an axis parallel with the aixs of said control member, a second arm oscillable about an axis parallel with the axis of said control member, said link and second named arm having cooperating parts for procuring a driving connection between said second named arm and link, and means for moving one of said cooperating parts out of and into engagement with the other.

6. In a doughnut machine in which the doughnuts are progressed along a way through the flow of the cooking liquid, a doughnut control member, pivot means for pivoting said control member for oscillation to control the travel of the doughnuts along the way, a link pivotally connected to a part movable with said control member at a locality eccentric from the axis of said control member and serving to oscillate said control member, a driving member movable to and fro in the direction of extent of said link, said driving member and link having two cooperating parts engaging one another for imparting movement to said link, and means for moving one of said parts out of engagement with the other.

7. In a doughnut machine in which the doughnuts are progressed along a way through the flow of the cooking liquid, a doughnut control member, pivot means for pivoting said control member for oscillation to control the travel of the doughnuts along the way, a link pivotally connected to a part movable with said control member at a locality eccentric from the axis of said control member and serving to oscillate said control member, a driving member movable to and fro in the direction of extent of said link, said driving member and link having juxtaposed parts, one of said parts having a notch therein and the other having a lug adapted to engage said notch and effect a driving connection between said driving member and link, and means for moving one of said parts to disconnect said lug from said notch.

8. In a doughnut machine in which the doughnuts are progressed along a way through the flow of the cooking liquid, a doughnut control member, pivot means for pivoting said control member for oscillation to control the travel of the doughnuts along the way, a link pivotally connected to a part movable with said control member at a locality eccentric from the axis of said control member and serving to oscillate said control member, a driving member movable to and fro in the direction of extent of said link, said driving member and link having juxtaposed parts, one of said parts having a notch therein and the other having a lug adapted to engage said notch and effect a driving connection between said driving member and link, and means for moving said link about its pivot to disconnect said lug from said notch.

9. In a doughnut machine in which the doughnuts are progressed along a way through the flow of the cooking liquid, a doughnut control member movable to and fro to control the travel of the doughnuts along the way, a link movable to and fro and connected to a part movable with said control member, a driving member movable to and fro, said driving member and link having juxtaposed parts, a notch formed in one of said parts, a lug carried by the other of said parts and adapted to engage said notch and effect a driving connection between said driving member and link, and means for moving one of said parts laterally with respect to the direction of movement of said link to disconnect said lug from said notch.

10. In a doughnut machine in which the doughnuts are progressed along a way through the flow of the cooking liquid, a doughnut control member movable in opposite directions to control the travel of the doughnuts along the way, a link movable in opposite directions and connected to a part movable with said control member, a driving member movable in opposite directions, said driving member and link having juxtaposed parts, a notch formed in one of said parts, a lug carried by the other of said parts and adapted to engage said notch and effect a driving connection between said driving member and link, said link having an elongated portion extending in the direction of movement of said link, and a shifting member having an opening through which said portion extends for moving said link laterally of the direction of movement of said driving member.

11. In a doughnut machine in which the doughnuts are progressed along a way through the flow of the cooking liquid, a doughnut control member movable in opposite directions to control the travel of the doughnuts along the way, a link movable in opposite directions and connected to a part movable with said control member, a driving member movable in opposite directions, said driving member and link having juxtaposed parts, a notch formed in one of said parts, a lug carried by the other of said parts and adapted to engage said notch and effect a driving connection between said driving member and link, said notch having opposed surfaces engaging said lug, one of said surfaces being of greater extent than the other, means for moving one of said parts to bring said lug beyond the shorter of the surfaces whereby movement is afforded to the link in one direction only.

12. In a doughnut machine in which the doughnuts are progressed along a way through the flow of the cooking liquid, a doughnut control member movable in an up and down direction to control the travel of the doughnuts along the way, a link movable in an up and down direction and connected to a part movable with said control member, a driving member movable in an up and down direction, said driving member and link having juxtaposed parts, a notch formed in one of said parts, a lug carried by the other part and engaging said notch for effecting a drive between said driving member and link, and a shift rod movable in a horizontal direction and engaging one of said parts for disconnecting said lug from said notch.

13. A doughnut machine comprising a kettle having a way along which the doughnuts are progressed through the flow of the cooking liquid, said kettle having a pocket adjacent a portion of said way, said kettle being provided with a wall forming said pocket and disposed adjacent the way, a doughnut control member in said way adjacent said wall, pivot means for said control member disposed within said pocket and carried by said wall, said control member having an arm movable therewith and disposed in said pocket, said arm moving in an up and down direction, said arm engaging the inner surface of said wall and restraining axial movement of said control member through engagement therewith, said wall having a slot therein conforming in configuration to the shape of the arm and out of register with the arm when the control device is in operative position, said control device being attached to the pivot means by axial movement thereof when the arm is in register with said slot, and means for swinging said arm and control member about the pivot means.

14. A doughnut machine comprising a kettle having a way along which the doughnuts are progressed through the flow of the cooking liquid, said kettle having a pocket adjacent a portion of said way, said kettle being provided with a wall forming said pocket and disposed adjacent the way, a doughnut control member in said way adjacent said wall, a shaft carried by said wall and extending transversely of the way, said shaft being supported at its inner end and free at its other end adjacent the way, a bearing carried by said control member and applicable to said shaft by axial movement from the free end thereof, an arm issuing outwardly from said bearing normally extending in the direction of extent of the way, a slot formed in said wall and extending in a direction angular with respect to the normal position of said arm, said arm and bearing being insertable through said slot to bring the arm into said pocket, said arm when in normal position engaging the inner surface of said wall and restraining axial movement of said control member, and means for oscillating said arm to operate said control member.

WALTER G. HOLMES.
WILLIAM R. COYNE.
ALEXANDER S. T. LAGAARD.